Oct. 16, 1923.

L. A. CHERRY 1,471,100

REGISTERING METER

Filed Dec. 13, 1919  2 Sheets-Sheet 1

INVENTOR
Lester A. Cherry
BY J. Wm Ellis
ATTORNEY

Oct. 16, 1923.

L. A. CHERRY

REGISTERING METER

Filed Dec. 13, 1919

INVENTOR
Lester A. Cherry
BY
ATTORNEY

Patented Oct. 16, 1923.

1,471,100

UNITED STATES PATENT OFFICE.

LESTER A. CHERRY, OF KENMORE, NEW YORK, ASSIGNOR, BY MESNE ASSIGNMENTS, TO MANLEY & BARLOW, OF CORRY, PENNSYLVANIA, A COPARTNERSHIP COMPOSED OF HENRY E. MANLEY AND GEORGE H. BARLOW.

REGISTERING METER.

Application filed December 13, 1919. Serial No. 344,661.

*To all whom it may concern:*

Be it known that I, LESTER A. CHERRY, a citizen of the United States of America, and a resident of the city of Kenmore, county of Erie, and State of New York, have invented certain new and useful Improvements in Registering Meters, of which the following is a full, clear, and exact description.

My invention relates generally to registering meters and more particularly to those types of meters which are used for measuring the flow of compressible fluids such as gases.

It is well known that one of the most widely used and exact instruments for the measurement of the flow of fluids is a so-called orifice meter, in which a thin plate having an orifice considerably smaller than the pipe conducting the fluid, is inserted in the pipe. The pressure of the fluid in passing through this orifice is reduced, and this drop in pressure is in direct proportion to the rate of flow through the orifice. In the measurement of gases, however, the true quantity of gas passing through the orifice is dependent not only on the volume of the gas but also on the weight of it per unit of volume, which is dependent upon the absolute static pressure. The formula by which the quantity of gas passing through the orifice is derived is as follows:

$$Q = C\sqrt{h(p+14.4)}$$

where $Q$ = the quantity of gas passing.

$C$ = a coefficient which takes into account the size of the orifice, the temperature of the gas and its specific gravity.

$h$ = the differential pressure in inches of water; i. e., the difference in pressure on the two sides of the orifice.

$p$ = the static gage pressure.

14.4 = an assumed average atmospheric pressure.

Under the present method two recording pressure gages are used in the pipe line, one of which records the differential pressure and the other the static gage pressure. The indications on the two gages are taken simultaneously at intervals close enough together to avoid the possibility of a "peak" appearing between them. Elaborate and cumbersome tables have been computed and by means of the readings taken from the gages at each interval, the proper figure is found in the table which shows the result which would be obtained by computing according to the above formula. As the intervals between readings on the gages are not greater than ten or fifteen minutes, it will be understood that a large number of chart readings must be taken for each gage for a single day's run, and the labor involved in taking the readings, finding the so-called "extensions", and the auditing of these readings from the charts takes considerable time, and there is large possibility of error.

The principal object of my invention has been to do away with all the manual work above described and to provide an instrument which shall accomplish this work mechanically. By the use of my instrument, the readings will be automatically taken and the "extensions" will be registered on a conventional gas meter dial, the only computation necessary is the applying of the proper constant "C".

In creating my invention I have sought to provide means for automatically determining the logarithms of the square roots of the differential and static pressures of fluids and the anti-logarithm of the sum of such logarithms.

Another object has been to provide an instrument so arranged that the quantity $\sqrt{h}$ may be determined from a differential gage and the quantity $$\sqrt{p+14.4}$$

may be determined from a static pressure gage. The product of these two quantities is automatically attained and a summation is then automatically made by the device and then indicated on a conventional meter dial.

As the number of readings taken each day are necessarily numerous it has been a further object of my invention to provide a device which will be very economical in the use of electric current for its operation.

Another object has been to provide a device which will be simple in its operation, of comparatively few parts, and one not liable to get out of order.

The above objects and advantages have been accomplished by the device shown in the accompanying drawings, of which:

Figure 1:
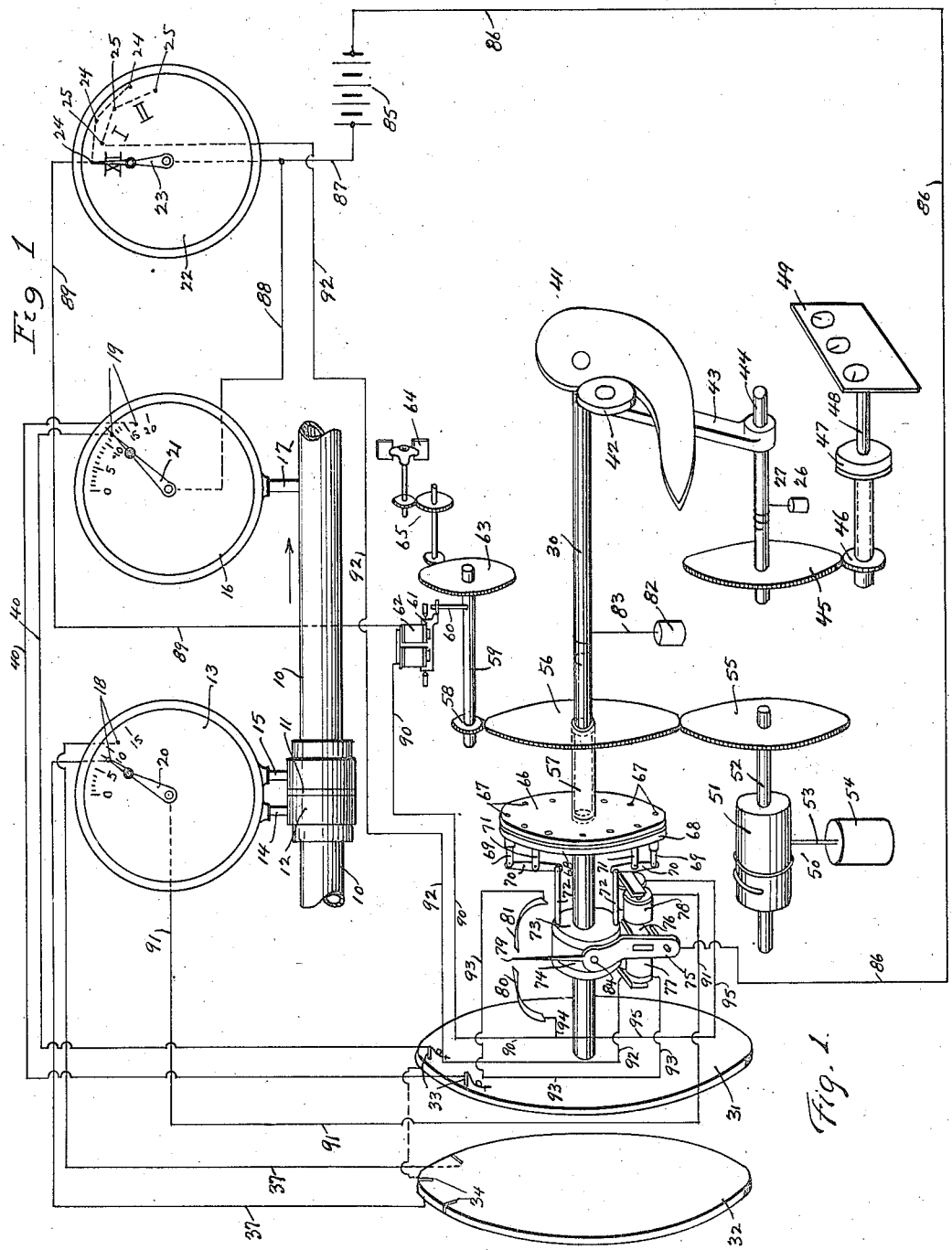
Fig. 1 is a diagrammatical view of my complete device, showing the parts largely in perspective.

Referring to the drawings, and more particularly to Fig. 1, 10 represents the gas pipe, in which the gas is flowing in the direction of the arrow. 11 is the disc having the known orifice and held between a suitable coupling 12. 13 is the differential pressure gage, having its connection 14 arranged on the supply side of the disc 11 and its connection 15 arranged on the exit side of said disc. 16 is the static pressure gage, the connection 17 of which is attached to the pipe 10 on the exit side of the disc 11. Each of the gages 13 and 16 is provided with a plurality of electrical contacts 18 and 19 respectively, which are arranged at suitable intervals around the dials of the gages. The differential gage 13 is provided with a pointer or hand 20 and the static pressure gage 16 is likewise provided with a pointer or hand 21. These hands are arranged to make contact with the contacts 18 and 19 in any one of the well known ways. The electrical connections with these contacts and hands will be hereinafter described.

A clock 22 is also provided, having a hand 23 and a plurality of actuating electrical contacts 24 and a plurality of interspaced resetting electrical contacts 25. The actuating contacts are arranged at desirable intervals, and for convenience of illustration I have shown these at five minute intervals. The resetting contacts 25 are interspaced between the actuating contacts and are, of course, also set at five minute intervals. The contacts of each set are suitably connected in series with each other and each series is connected with a suitable electrical lead, hereinafter described. The hand 23 of the clock passes over each set of contacts and is arranged to make suitable electrical connection therewith.

Figure 3:
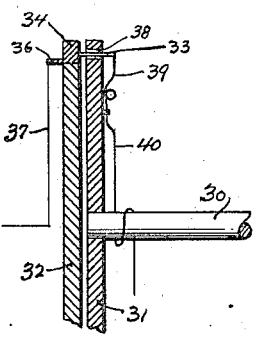
Fig. 3 is a fragmentary, sectional view of the rotatable and stationary discs.
Figure 5:
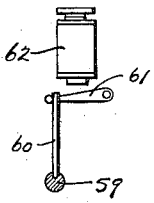
Fig. 5 is a detail view showing the magnetically controlled stop.
Figure 2:
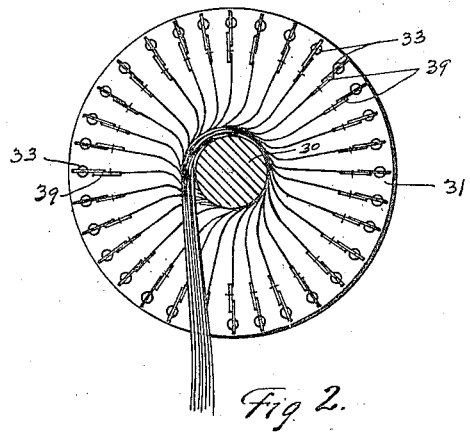
Fig. 2 is a face view of the rotatable disc.
Figure 4:
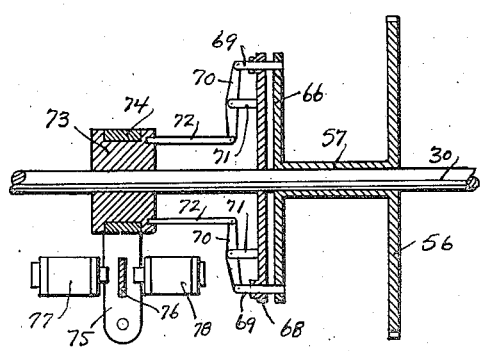
Fig. 4 is an enlarged, fragmentary, sectional view of the clutch means.

The means for automatically taking the "extensions" and indicating them upon a conventional gas meter dial comprises preferably a shaft 30 suitably journaled, to one end of which is rigidly secured a rotatable disc 31. Adjacent the rotatable disc 31 is a stationary disc 32 (see Fig. 3). For convenience of illustration, these discs are shown separated in the somewhat diagrammatical view shown in Fig. 1. The rotatable disc 31 is provided with a series of electrical contact pins 33 laid off proportionately to the logarithm of the $$\sqrt{p+14.4}$$

in a clockwise direction. The stationary disc 32 is also provided with a series of electrical contact inserts 34, which are laid off proportionately to the logarithm of the $\sqrt{h}$ in a counter-clockwise direction as viewed from the right hand side of Fig. 1. The discs 31 and 32 are composed of non-conductive material and the contact inserts 34 of the stationary disc are arranged in suitable slots formed in the periphery of the disc. Each of the inserts is provided with a contact tab 36 to each of which a lead 37 is connected. The contact pins 33 of the rotatable disc are each slidably disposed within a sleeve 38 secured in the rotatable disc. The ends of the contact pins 33 are held in engagement with the inner face of the stationary disc 32 preferably by means of a series of springs 39. Each of the contact pins 33 is connected through the medium of the springs 39 with a suitable lead 40. In Fig. 1 for convenience and clearness of illustration, I have shown but two of the contact pins 33 and inserts 34 with their connecting circuits. The leads 40 preferably extend radially toward the center of the disc, where they are arranged in the form of a bundle and wrapped about the shaft 30 for about one turn in a counter-clockwise direction, so that when the disc is rotated in a counter-clockwise direction, these leads will be partially unwrapped (see Fig. 2). Each of the leads 37 is connected with one of the contacts 18 of the differential gage 13 in such a manner that successive contacts made by the hand 20 as it moves in a clockwise direction will successively select the contact inserts 34 of the stationary disc in a counter-clockwise direction. Each of the leads 40, is connected with one of the contacts 19 of the static pressure gage 16, and these leads are so arranged that the successive engagement of the hand 21 with the contacts 19, when it is rotating in a clockwise direction, will successively select the contact pins 33 in a clockwise direction. As the contact pins 33 and inserts 34 of the rotatable and stationary discs 31 and 32, respectively, are arranged in a clockwise and counter-clockwise direction, respectively, it will be evident that when the rotatable disc 31 is turned in a counter-clockwise direction and one of the contact pins 33 thereon representing the logarithm of $$\sqrt{p+14.4},$$

contacts with one of the contact inserts representing the logarithm of $\sqrt{h}$ that the total angular distance through which the rotatable disc turns will represent the sum of the two logarithms or the logarithm of the product of the two square roots above stated. From the foregoing it will be clear that the discs 31 and 32 are calibrated by the proportionate arrangement of the series of contacts 33 and 34 and for clearness of identification the discs are referred to in the appended claims as calibrated discs.

Secured at the right-hand end of the shaft 30 is a cam 41 and engaging with this cam 41 is a roller 42. This roller is carried at the upper end of an arm 43, rigidly attached to a shaft 44. This shaft is rotatably mounted in suitable bearings and carries a gear 45 which meshes with a gear 46. 47 is a ball ratchet of the well known type or any other suitable means for imparting motion in one direction only. The forward moving part of this ratchet is secured to a shaft 48 and the reversible part thereon is connected with the gear 46. 49 is a gas dial of the conventional form and is actuated by the shaft 48. The ratchet 47 is arranged so that it will be actuated only when the reversible part thereof is actuated in a clockwise direction. A weight 26 is so attached to the shaft 44 by a cable 27 that it will always keep the roller 42 in engagement with the cam 41. The cam 41 is so shaped that when it rotates in a counter-clockwise direction through an angle corresponding to the logarithm of a number, it causes the cam lever 43 and the shaft 44 to rotate in a counter-clockwise direction through an angle corresponding to the number itself or the anti-logarithm. It will be clear, therefore, that if the shaft 30 is rotated a distance corresponding to the extension of the readings of the two gages, that the shaft 44 and its connected parts will be rotated so as to record on the dial the number corresponding to the anti-logarithm of the sum of the logarithms indicated by the rotatable and stationary discs.

The means for actuating the rotatable disc comprises preferably a weight motor 50 or any other suitable form of motive power. The weight motor 50 comprises a drum 51 mounted upon a shaft 52 and having a cable 53 wrapped about the drum. A suitable weight 54 is secured at the lower end of the cable 53, whereby the shaft 52 will be rotated in a clockwise direction when the weight is released. A gear 55 is secured to the shaft 52 and meshes with a gear 56. The gear 56 is mounted upon one end of a sleeve 57, which is rotatably disposed upon the shaft 30. The gear 56 meshes with a gear 58, carried by a stop shaft 59. This stop shaft carries a stop pin 60 which is engageable with the armature 61 of stop electro-magnet 62, whereby the weight motor 50 is controlled. A gear 63 is mounted upon the stop shaft 59 and a fan 64 is connected with the gear by a suitable train of gearing 65, and acts as a brake or governor to control the speed of the weight motor.

Connected to the opposite end of the sleeve 57 is a clutch plate 66 having a series of apertures 67. A clutch-pin disc 68 is rigidly carried by the shaft 30 and in close proximity to the clutch plate 66. This clutch-pin disc carries preferably two oppositely arranged clutch pins 69, which are slidable within the disc 68 and engageable with the apertures 67 of the clutch plate. The movement of each of the clutch pins 69 is controlled by a lever 70, pivotally mounted in a standard 71, carried by the clutch-pin disc 68 and having a rod 72 connecting its inner end with a clutch ring 73, slidably carried by the shaft 30. As the ring 73 is moved toward the clutch-pin disc 68, the pins 69 will be withdrawn from their engagement with the apertures 67 and, likewise, when the ring 73 is moved away from the clutch-pin disc 68, the clutch pins 69 will be moved into engagement with the apertures 67. This serves to connect and disconnect the shaft 30 with the weight motor 50. The clutch ring 73 is provided with a loosely mounted collar 74, arranged in an annular recess in the ring and a yoke 75 is pivotally connected at 84 to the collar 74. The yoke 75 carries an electro-magnet armature 76, and a resetting electro-magnet 77 is arranged at one side of the armature and a clutch electro-magnet 78 is arranged at the other side thereof. The magnets are energized through suitable circuits to be hereinafter described and they serve to move the clutch pins 69 by means of the yoke 75 and the collar 74. The yoke 75 is provided with an upwardly extending contact rod 79 which is engageable with either of the spring contact members 80 or 81, each of which is suitably mounted above the clutch ring 73 and on each side of the central position of the finger 79. A weight 82, or other suitable and equivalent means, having a cable 83, which is preferably wrapped about the shaft 30 in a counter-clockwise direction, is provided for moving the shaft 30 and its connected parts back to the position shown in Fig. 1, when the clutch pins 69 release the shaft from engagement with the weight motor 50.

Figure 6:
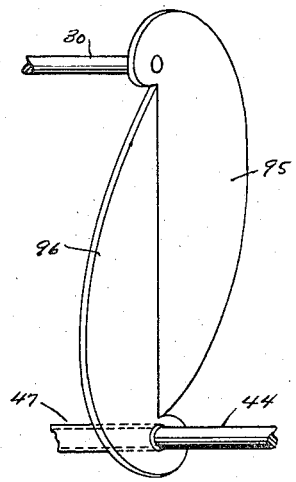
Fig. 6 shows a modified cam arrangement for reducing the logarithmic movement of the rotatable disc to a straight, rotary motion.

In Fig. 6, I have shown a modified form of connection between the shafts 30 and 44. Instead of the cam 41 and roller 42 of the form shown in Fig. 1, I employ two cams 95 and 96, the cam 95 being connected with the shaft 30 and the cam 96 with the shaft 44. These cams are so designed that they impart to the shaft 44 the same angular movement as the cam 41 and roller 42.

Referring again to Fig. 1, 85 is a battery by which the electro-magnets and the circuits of my device are energized. The positive side of the battery is connected with the yoke 75 by means of a lead 86, and the negative side of the battery is connected with the hand 23 of the clock by means of the lead 87 and with the hand 21 of the static pressure gage 16 by means of the lead 88. The actuating contacts 24 of the clock, as hereinbefore stated, are connected in series and a lead 89 connects them with the stop magnet 62. Leads 90 and 94 connect the other side of the stop magnet 62 with the contact members 80. A lead 95 connects one side of the clutch magnet 78 with the lead 94. The other side of the clutch magnet 78 is connected with the hand 20 of the differential gage 13 by means of a lead 91. As hereinbefore stated, the contacts 18 of the differential gage 13 are each connected with one of the contacts 34 of the stationary disc by means of leads 37, and the contacts 19 of the static pressure gage are each connected with one of the contacts 33 of the rotatable disc by means of leads 40. The series of resetting contacts 25 on the clock 22 are connected with one side of the resetting magnet 77 by means of the lead 92. The other side of this magnet is connected with the contact member 81 by means of the lead 93. The contact member 80 is connected with the lead 90 by means of a lead 94.

In the description of the operation of the device, it will be assumed that certain differential and static pressures, existing in the pipe 10 at or near the disc 11, will have moved the hands 20 and 21 of the differential gage and static gage, respectively, to the positions shown in Fig. 1. The contact 18 under the hand 20 of the differential gage 13 will now be connected with the corresponding contact 34 on the stationary disc by means of one of the leads 37, and the contact 19 of the static pressure gage 16 beneath the hand 21 thereof, will be connected with its corresponding contact 33 on the rotatable disc 31 by one of the leads 40. It will be assumed that the hand 23 of the clock has now reached the position shown in Fig. 1, where one of the contacts 24 is beneath it and in contact therewith. It is to be understood that the clutch pins 69 have been brought into engagement with the apertures 67 of the clutch plate 66 by the previous operation of the device. When in this position, the contact rod 79 will have been moved to a position of contact with the contact member 80. A circuit, energized by the battery 85, is thus established through lead 86, yoke 75, contact rod 79, contact member 80, leads 94 and 90, through the stop magnet 62, lead 89, contact point 24 and hand 23 of the clock, back to the battery through the lead 87. As soon as the stop magnet 62 is energized its armature 61 will be raised, thus disengaging the stop pin 60 and releasing the weight motor 50. As the clutch pins 69 are in engagement with the clutch plate 66, the weight motor 50 will cause the rotation of the shaft 30 in a counter-clockwise direction. As the shaft 30 rotates, the cam 41 will also be rotated and will move the roller arm 43, rotate the shaft 44 and the hands of the dial 49. As the rotatable disc 31 moves adjacent the face of the stationary disc 32, the contact 33 which is connected with the contact 19 under the hand 21 of the static pressure gage will come into registering position with the contact 34 which is connected with the point 18 under the hand 20 of the differential pressure gage. When this occurs a circuit will be completed from the battery 85, through lead 86, yoke 75, contact rod 79, contact member 80, leads 94 and 95, clutch magnet 78, lead 91, hand 20, engaged contact 18, selected lead 37, and its contact 34, contact 33 of the selected lead 40, engaged contact 19 and hand 21 of the static pressure gage, and leads 88 and 87, back to the battery. When the circuit just above described is established, the clutch magnet 78 will be energized and will cause the clutch ring 73 to be moved to the right in Fig. 1, thus withdrawing the clutch pins 69 from engagement with the clutch plate 66 and thereby stopping the rotation of the shaft 30. As the yoke 75 is moved to the right the contact of the contact rod 79 thereof with the contact member 80 is broken, thus de-energizing the circuit just above described and also de-energizing the circuit of the stop magnet 62, which allows its armature to fall and to engage with the stop pin 60, thus arresting the movement of the weight motor 50. It will be seen that when the selected contact 33 on the rotatable disc 31, which represents the logarithm of $$\sqrt{p+14.4},$$

comes into registering position with the selected contact 34 of the stationary disc 32, which represents the logarithm of the $\sqrt{h}$, the total angular distance through which the rotatable disc has moved will represent the sum of the two logarithms, or the logarithm of the product of the two quantities involved. As hereinbefore stated, the cam 41 is so formed that when it is rotated in a counter-clockwise direction through an angular distance equal to the logarithm of a number, it will impart to the roller arm 43 and shaft 44 a rotation through an angle corresponding to the number itself, so that the "extension" corresponding to the readings on the two gages is indicated directly upon the dial 49 of the meter.

As the hand 23 of the clock continues to rotate, it will contact with one of the intermediate resetting contacts 25 and a circuit will then be established from the battery 85 through lead 86, yoke 75, contact rod 79, contact member 81, lead 93, resetting magnet 77, lead 92, contact 25, hand 23 and lead 87, back to the battery. When this circuit is established, the resetting magnet 77 will be energized and thereby cause the clutch ring 73 to be moved to the left in Fig. 1. This will cause the clutch pins 69 to again engage with the clutch plate 66, in which position it will be ready to indicate the next "extension". The gears 56 and 58 are so proportioned with respect to the apertures 67, that a set of these will always be in registering position with the clutch pins when the shaft 59 is stopped by the pin 60. It will be evident that when the shaft 30 has been moved by the weight motor 50 in a counter-clockwise direction, the cable 83 of the weight 82 will be wound about the shaft. When the clutch magnet 78 releases the clutch pins 69 from the plate 66, the shaft 30 will be free to rotate in a clockwise direction and be returned by the weight 82 to its initial position, as shown in Fig. 1. As the cam 41 is moved in a counter-clockwise direction it will move the roller arm 43 and shaft 44 also in a counter-clockwise direction and the shaft 48 of the indicating dial 49 in a clockwise direction. When the cam 41 is moved back to its original position by the weight 82, the weight 26 will return the arm 43 to its original position. During this return the ratchet 47 is released, allowing the hands on the dial to remain stationary.

It will be seen that my device is very economical in the use of electric current for the operation thereof, inasmuch as the circuit established through the selected contacts 33 and 34 is established only momentarily and is immediately broken by the disengagement of the contact rod 79 with the contact member 80. The stop magnet 62 is energized only until the selected contacts 33 and 34 have come into engagement. The resetting magnet 77 is also energized only momentarily, the circuit being immediately broken by the disengagement of the contact rod 79 with the contact member 81.

The term, static pressure is to be understood as meaning the absolute static pressure; viz, gage pressure plus atmospheric pressure.

For convenience in the claims, I will refer to the pressure gauges as the selecting means of the claims, and the arrangement of the contacts on the discs 31 and 32 as the means for determining the logarithms of any mathematical functions of a plurality of numbers. The discs, together with the means for producing a relative rotation through selected distances, are the means for determining the sum of the logarithms. The means for resetting the determining means of the appended claims is the weight 82. The means for summing up the total of all the logarithms is the dial 49, together with its co-acting mechanism. The means governing the actuation of the determining means or discs comprises the clutch and the weight motor, together with their associated mechanisms. The cam 41, with its co-acting mechanism, is the means for determining the anti-logarithm of the logarithmic sum.

Obviously, some modifications of the details herein shown and described may be made without departing from the spirit of my invention or the scope of the appended claims; and I do not, therefore, wish to be limited to the exact embodiment herein shown and described, the form shown being merely a preferred embodiment thereof.

Having thus described my invention, what I claim is:

1. A registering meter comprising a plurality of selecting means, and means for automatically determining the logarithm of any mathematical function of the number indicated by each of the selecting means.

2. A registering meter comprising electrically controlled and power driven means for automatically determining the logarithms of any mathematical functions of the numbers indicating differential and static pressures.

3. A registering meter comprising a plurality of selecting means, means for automatically determining the logarithm of any mathematical function of the number indicated by each of the selecting means, and means for determining the sum of the logarithms.

4. A registering meter comprising a plurality of selecting means, means for automatically determining the logarithm of any mathematical function of the number indicated by each of the selecting means, means for determining the sum of the logarithms, and means for determining the anti-logarithm of the logarithmic sum.

5. A registering meter comprising a plurality of selecting means, a member having electric contacts laid off in one direction, proportionately to the logarithm of a mathematical function of a number indicated by one selecting means, a member having electric contacts laid off in the opposite direction, proportionately to the logarithm of a mathematical function of another number indicated by another selecting means, and means for moving one of the members.

6. A registering meter comprising a plurality of selecting means, means for determining the logarithm of any mathematical function of the number indicated by each of the selecting means, means for determining the sum of the logarithms, means for determining the anti-logarithm of the logarithmic sum, and means for summing up the total of all the anti-logarithms so determined.

7. A registering meter comprising selecting means, means for automatically determining the logarithms of any mathematical functions of a plurality of numbers indicated by the selecting means, means for determining the sum of the logarithms, means for determining the anti-logarithm of the logarithmic sum, and means for resetting the several determining means.

8. A registering meter comprising selecting means, a fixed calibrated member, a movable calibrated member associated with the fixed member, and means connecting the members with the selecting means for automatically selecting a number on each member and determining the logarithm of any mathematical function of each number so selected.

9. A registering meter comprising selecting means, a member having electric contacts laid off in one direction, a member having electric contacts laid off in the opposite direction, the contacts of the members being laid off proportionately to the logarithms of any mathematical functions of the numbers indicated by the selecting means, the members being relatively movable, means for obtaining the sum of any two logarithms indicated by engaging contacts, and means for stopping the movement of the members when the sum of the two logarithms has been determined.

10. A registering meter comprising selecting means actuated in accordance with differential and static pressures, a fixed calibrated member, a movable calibrated member, a shaft for operating the movable member, a motor for rotating the shaft, a clutch arranged between the shaft and motor, a clutch magnet for disengaging the clutch, a resetting magnet for engaging the clutch, an armature controlled by the magnets, a pivotally mounted yoke carrying the armature, a movable electric contact carried by the yoke, contact members arranged in the path of movement of the movable member, and electric means for controlling the operating of the elements above set forth.

11. A registering meter comprising selecting means, a fixed calibrated member, a movable calibrated member, means connecting the members with the selecting means for automatically selecting a plurality of numbers and determining the logarithms of any mathematical functions of the numbers, means for determining the sum of the logarithms, and a cam operable with the movable calibrated member for determining the anti-logarithm of the logarithmic sum.

12. A registering meter comprising selecting means actuated in accordance with differential and static pressures, a fixed calibrated member, a movable calibrated member, means for operating the movable member, a motor for actuating the operating means, a clutch connecting the operating means and the motor, electro-magnetically operated means for engaging the clutch, electro-magnetically operated means for disengaging the clutch, and clock-controlled means for the electro-magnetic clutch engaging means.

In testimony whereof, I have hereunto signed my name.

LESTER A. CHERRY.